United States Patent
Morrison et al.

(10) Patent No.: US 10,613,593 B1
(45) Date of Patent: Apr. 7, 2020

(54) FLIP POSITION DETECTION

(71) Applicant: Motorola Mobility LLC, Chicago, IL (US)

(72) Inventors: Wayne Garrett Morrison, Lake Zurich, IL (US); Dennis J. Budnick, Richmond, IL (US); Sanjay N. Kadiwala, Roselle, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/654,813

(22) Filed: Oct. 16, 2019

Related U.S. Application Data

(63) Continuation of application No. 16/273,569, filed on Feb. 12, 2019, now Pat. No. 10,481,644.

(51) Int. Cl.
*G06F 1/16* (2006.01)

(52) U.S. Cl.
CPC .......... *G06F 1/1677* (2013.01); *G06F 1/1616* (2013.01); *G06F 1/1681* (2013.01)

(58) Field of Classification Search
CPC ..... G06F 1/1616; G06F 1/1677; G06F 1/1681
See application file for complete search history.

(56) References Cited

U.S. PATENT DOCUMENTS

| | | | |
|---|---|---|---|
| 6,792,246 B2 | 9/2004 | Takeda et al. | |
| 7,869,842 B2 * | 1/2011 | Kim | H04M 1/0216 455/550.1 |
| 7,869,843 B2 | 1/2011 | Ladouceur et al. | |
| 8,649,825 B2 | 2/2014 | van Wonterghem et al. | |
| 10,481,644 B1 | 11/2019 | Morrison et al. | |
| 2006/0142072 A1 | 6/2006 | Krenz et al. | |
| 2006/0155391 A1 | 7/2006 | Pistemaa et al. | |
| 2008/0311962 A1 | 12/2008 | Demuynck | |
| 2010/0061054 A1 | 3/2010 | Ladouceur et al. | |
| 2010/0085274 A1 * | 4/2010 | Kilpatrick, II | G06F 1/1616 345/1.3 |

OTHER PUBLICATIONS

"Notice of Allowance", U.S. Appl. No. 16/273,569, dated Sep. 18, 2019, 10 pages.
Fericean,"New Noncontacting Inductive Analog Proximity and Inductive Linear Displacement Sensors for Industrial Automation", Nov. 2007, pp. 1538-1545.
Kejik,"A low-cost inductive proximity sensor for industrial applications", Jul. 2003, pp. 93-97.

\* cited by examiner

*Primary Examiner* — David Bilodeau
(74) *Attorney, Agent, or Firm* — SBMC

(57) ABSTRACT

In aspects of flip position detection, a mobile device has a device housing with a base section and a flip section that folds onto the base section. The mobile device has a hinge that operates between open and closed positions of the device, and the flip section of the device housing operates to open relative to the base section of the device housing. An inductor is positioned in the device housing to have an inductance as the hinge operates to open and close the device housing. A metal plate is coupled to the hinge in a configuration that translates the metal plate relative to the inductor as the hinge operates between the open and closed positions. A sensor is implemented to detect the inductance between the inductor and the metal plate, where inductance values indicate the closed and open positions of the device housing.

20 Claims, 8 Drawing Sheets

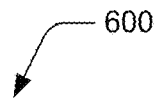

```
                              ┌─ 600
                              ▼
┌─────────────────────────────────────────────────────────┐
│ Open and close a device housing of a hinged device      │
│ with a hinge that operates to fold a flip section of the│
│ device housing onto a base section of the device        │
│ housing in a closed position of the hinged device       │
│                          602                            │
└─────────────────────────────────────────────────────────┘
                              │
                              ▼
┌─────────────────────────────────────────────────────────┐
│ Rotate a capacitive sensor along with the hinge as it   │
│ operates to open and close the device housing of the    │
│ hinged device                                           │
│                          604                            │
└─────────────────────────────────────────────────────────┘
                              │
                              ▼
┌─────────────────────────────────────────────────────────┐
│ Generate a capacitance by the capacitive sensor coupled │
│ to the hinge in a configuration operable to translate a │
│ hinge component relative to the capacitive sensor as the│
│ hinge operates to open and close the device housing of  │
│ the hinged device                                       │
│                          606                            │
└─────────────────────────────────────────────────────────┘
                              │
                              ▼
┌─────────────────────────────────────────────────────────┐
│ Determine an open position of the flip section of the   │
│ device housing relative to the base section of the      │
│ device housing based on a detected capacitance          │
│ indicating the open position of the hinge               │
│                          608                            │
└─────────────────────────────────────────────────────────┘
                              │
                              ▼
┌─────────────────────────────────────────────────────────┐
│ Determine a closed position of the flip section of the  │
│ device housing relative to the base section of the      │
│ device housing based on a detected capacitance          │
│ indicating the closed position of the hinge             │
│                          610                            │
└─────────────────────────────────────────────────────────┘
```

FIG. 6

FLIP POSITION DETECTION

RELATED APPLICATION

This application is a continuation of and claims priority to U.S. patent application Ser. No. 16/273,569 filed Feb. 12, 2019 entitled "Flip Position Detection," the disclosure of which is incorporated by reference herein in its entirety.

BACKGROUND

Generally, some electronic, consumer, and/or computing devices, such as laptop computers, flip phones, and other types of devices that are foldable, may be designed with a hinge mechanism. For example, mobile flip-phones are a type of mobile phone that are generally designed with independent housing sections, and the sections of the housing open apart and fold together with a hinge mechanism. Mobile flip-phones are still prevalent and widely used, and features of the devices can include detecting whether a device has been flipped closed to initiate a device shutdown, or flipped open to initiate turning-on the device or components of the device. However, the conventional techniques for flip detection are largely inadequate for many styles of flip-phones, primarily due to the volume of space that is taken up inside of the device housing by the conventional hinge mechanisms and techniques. Some conventional techniques include using a mechanical switch to detect position and then open or close a circuit, or a magnet with a hall effect sensor to detect proximity based on the strength of a magnetic field. However, mechanical switches are bulky and difficult to design around aesthetically, can be noisy, and may be subject to a shorter life-cycle. Similarly, a hall effect sensor and magnet system can take up too much physical space in the housing of a device.

BRIEF DESCRIPTION OF THE DRAWINGS

Aspects of flip position detection are described with reference to the following Figures. The same numbers may be used throughout to reference similar features and components that are shown in the Figures:

FIG. 6 illustrates an example method of flip position detection, generally in the context of capacitive flip position detection, in accordance with one or more implementations described herein.

DETAILED DESCRIPTION

Figure 1:
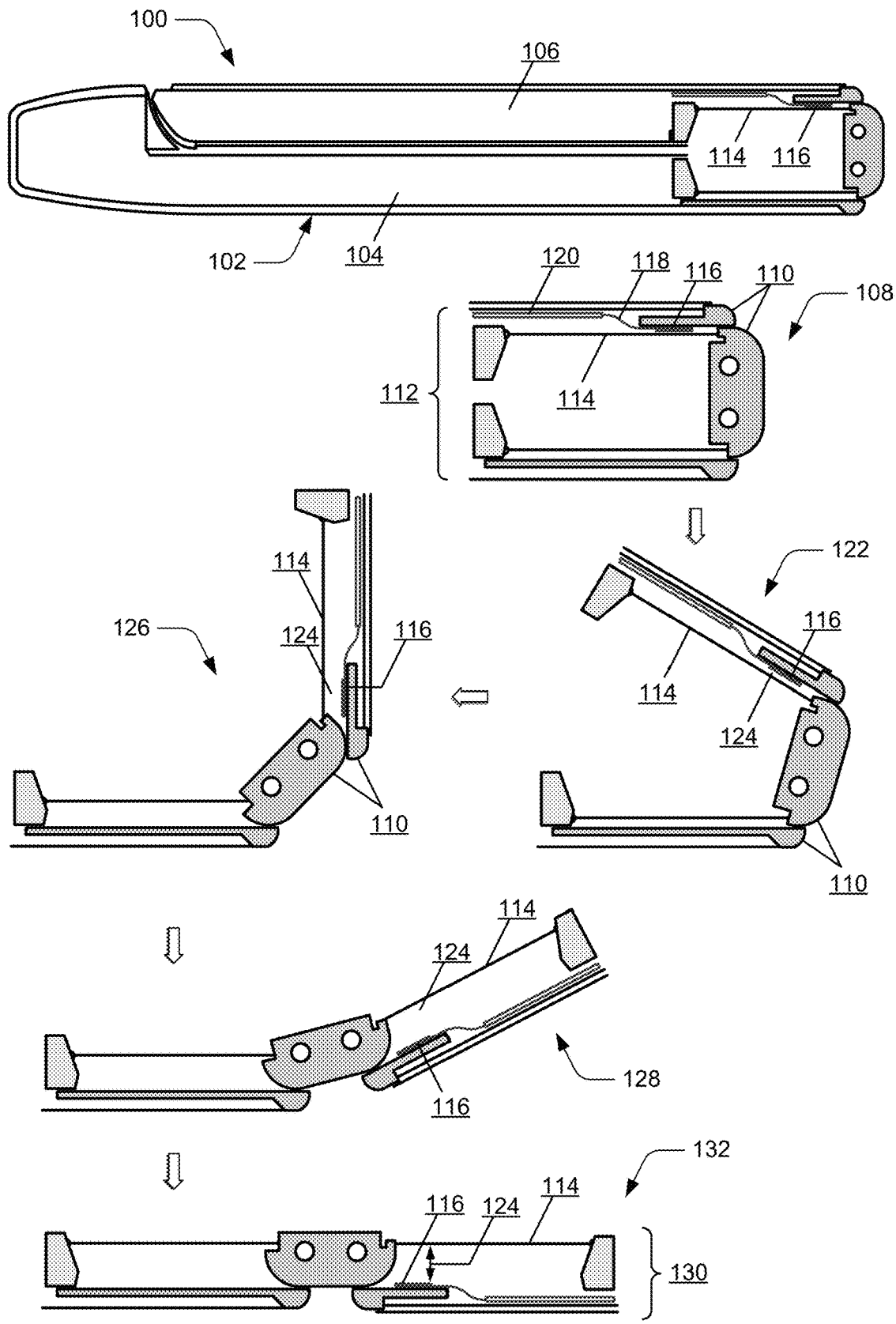
FIG. 1 illustrates an example environment in which aspects of flip position detection can be implemented.

Flip position detection is described, and may be implemented in a mobile device, such as in a mobile flip-phone with a hinge system designed for inductive sensing as a hinge operates to open and close in the device. Although generally described herein as a hinge system designed for inductive sensing, such as for inductive flip position detection, a hinge system may be similarly designed in a mobile flip-phone with other passive materials, such as for capacitive flip position detection or resistive flip position detection implemented with respective capacitive or resistive materials that interact with a hinge plate to detect an open or closed position of the device.

In aspects of flip position detection, an inductance sensor of the hinge system is implemented to detect the inductance of structural elements that move relative to each other as the hinge operates to open and close. An increasing or higher inductance indicates a closed position of the hinge, whereas a decreasing or lower inductance indicates an open position of the hinge. When implemented in a mobile flip-phone that has a device housing with a base section and a flip section that folds onto the base section, the hinge is operable to open and close the flip section of the device housing relative to the base section of the device housing. Similar to the detected inductance indicating the hinge position of the hinge being open or closed, an increasing or higher inductance indicates a closed position of the device housing of the mobile flip-phone, and a decreasing or lower inductance indicates an open position of the device housing of the device.

Alternatively or in addition, a device controller can be implemented to determine multiple positions of the hinge between fully-open and fully-closed positions, where the multiple positions of the hinge correspond to, and are determined from, changing inductance values that are detected by the inductance sensor for position determination as the hinge operates to open and close. Notably, the device controller can be implemented for multi-position determination of the flip section of the device housing relative to the base section of the device housing of the mobile flip-phone.

In aspects of the described flip position detection, the hinge system incorporates a metal plate and an inductor that is positioned to have an inductance as the hinge operates to open and close, and when implemented in a mobile device, the hinge operates between a closed position and an open position of the device housing of the mobile device. In implementations, the inductor and the metal plate rotate along with the hinge as it operates between the open and closed positions of the mobile device. Even though the inductor and the metal plate rotate as the hinge rotates, the metal plate remains approximately parallel with the inductor. Additionally, the metal plate translates relative to the inductor as the hinge operates between the open and closed positions of the mobile device. Notably, the metal plate translates perpendicularly, or approximately perpendicular, away from the inductor as the hinge operates to open, thus increasing the distance between the metal plate and the inductor and decreasing the inductance. Similarly, the metal plate translates perpendicularly, or approximately perpendicular, towards the inductor as the hinge operates to close, thus decreasing the distance between the metal plate and the inductor and increasing the inductance.

In alternate implementations of flip position detection, a capacitive sensor of the hinge system is implemented to detect a capacitance between structural elements that move relative to each other as the hinge operates to open and close. An increasing or higher capacitance indicates an open position of the hinge, whereas a decreasing or lower capacitance indicates a closed position of the hinge. When implemented in a mobile flip-phone that has a device housing with a base section and a flip section that folds onto the base section, the hinge is operable to open and close the flip section of the device housing relative to the base section of the device housing. Similar to the detected capacitance indicating the hinge position of the hinge being open or closed, an increasing or higher capacitance indicates an open position of the device housing of the mobile flip-phone, and a decreasing or lower capacitance indicates a closed position of the device housing of the device. Additionally, a device controller can be implemented to determine multiple positions of the hinge between fully-open and fully-closed positions, where the multiple positions of the hinge correspond to, and are determined from, changing capacitance values that are detected by the capacitive sensor for position determination as the hinge operates to open and close. Notably, the device controller can be implemented for multi-position determination of the flip section of the device housing relative to the base section of the device housing of the mobile flip-phone.

In alternate implementations of flip position detection, a resistive sensor of the hinge system is implemented to detect a resistance between structural elements that move relative to each other as the hinge operates to open and close. When implemented in a mobile flip-phone that has a device housing with a base section and a flip section that folds onto the base section, the hinge is operable to open and close the flip section of the device housing relative to the base section of the device housing. Similar to the detected resistance indicating the hinge position of the hinge being open or closed, the resistance can indicate an open or closed position of the device housing of the mobile flip-phone. Additionally, a device controller can be implemented to determine multiple positions of the hinge between fully-open and fully-closed positions, where the multiple positions of the hinge correspond to, and are determined from, changing resistance values that are detected by the resistive sensor for position determination as the hinge operates to open and close. Notably, the device controller can be implemented for multi-position determination of the flip section of the device housing relative to the base section of the device housing of the mobile flip-phone.

Aspects of the described flip position detection provide for flip proximity detection in a mobile device using the hinge system in a smaller space than can be accomplished with the conventional techniques using a mechanical switch or a hall effect sensor and magnet. Accordingly, newer generations of flip-phones can be designed smaller with the more efficient flip position detection provided by the described hinge system. The hinge system for flip position detection can be implemented in less space in a device housing, thus providing more of the needed space for other device components.

While features and concepts of flip position detection can be implemented in any number of different devices, systems, environments, and/or configurations, aspects of flip position detection are described in the context of the following example devices, systems, and methods.

FIG. 1 illustrates an example of a mobile device 100 in which aspects of flip position detection can be implemented. In this example, the mobile device 100 is representative of a mobile flip-phone that includes a device housing 102 with a base section 104 of the device housing and a flip section 106 of the device housing. The mobile device 100 is implemented with a hinge system 108 that includes a hinge 110 and components operable to open and close the flip section 106 of the device housing 102 relative to the base section 104 of the device housing. In this example, the mobile device 100 is implemented for inductive flip position detection with the hinge system 108 designed for inductive sensing. Although the hinge system 108 is generally described herein and shown in the figures as being designed for inductive sensing, such as for inductive flip position detection, a hinge system may be similarly designed in a mobile flip-phone with other passive materials, such as for capacitive flip position detection or resistive flip position detection implemented with respective capacitive or resistive materials that interact with a hinge plate to detect an open or closed position of the device.

The hinge system 108 incorporates a metal plate 114 and an inductor 116 that is positioned to have an inductance as the hinge 110 operates between the closed position 112 and an open position of the mobile device 100. In implementations, the inductor 116 is generally a flat, inductive coil positioned in the device housing 102 on a flexible printed circuit (FPC) 118 that couples to an inductance sensor 120. The FPC 118 can be bonded in the device housing 102, and the inductance sensor 120 can be implemented as an inductance-to-digital converter (LDC) on an integrated circuit. In implementations, the metal plate 114 may be a structural element of the device housing 102, providing structural support for the device housing and/or other components in the mobile device. Although the metal plate 114 and the inductor 116 of the hinge system 108 are generally illustrated as being implemented in the flip section 106 of the overall device housing 102, any of the components described herein may be similarly implemented in the base section 104 of the device housing, or in both the base section and the flip section of the device housing.

The inductor 116 and the metal plate 114 rotate along with the hinge 110 as it operates between the closed position 112 and an open position of the mobile device. Even though the inductor 116 and the metal plate 114 rotate as the hinge 110 rotates, the metal plate 114 remains approximately parallel with the inductor 116. Generally, the metal plate 114 can be designed to remain parallel with the inductor 116 as the hinge 110 rotates, however, some angular variations may occur between the metal plate and the inductor as the hinge rotates, or angular variations between the metal plate and the inductor may be a design choice. Additionally, the metal plate 114 translates relative to the inductor 116 as the hinge 110 operates between the closed position 112 and an open position of the mobile device, as shown in the sequence of illustrations in FIG. 1. In implementations, the metal plate 114 translates perpendicularly, or approximately perpendicular, relative to the inductor 116 as the hinge 110 operates between the closed position 112 and the open position of the mobile device.

Initially, in the closed position 112 of the hinge system 108, there is little to no distance or space between the metal plate 114 and the inductor 116. In implementations, the distance between the metal plate 114 and the inductor 116 may be approximately 0.12 mm in the closed position 112. As shown next at 122, the hinge 110 operates to begin opening, which in this example, also begins to open the flip section 106 of the device housing 102 relative to the base section 104 of the device housing of the mobile device 100. The distance 124 between the metal plate 114 and the inductor 116 begins to increase as the hinge 110 operates to open. As shown next at 126, the hinge is open to approximately ninety-degrees (90 deg) and the distance 124 between the metal plate 114 and the inductor 116 is increasing.

This increasing distance 124 is due to the metal plate 114 translating relative to the inductor 116 (e.g., away from the inductor) as the hinge 110 operates to open. The hinge 110 continues to open as shown at 128 until the hinge reaches the open position 130 of the mobile device as shown at 132, where the hinge is open to approximately one-hundred eighty degrees (180 deg). In implementations, the distance between the metal plate 114 and the inductor 116 may be approximately 3.8 mm in the open position 130. Similar to the hinge opening, the distance 124 between the metal plate 114 and the inductor 116 decreases as the hinge 110 operates to close, and the decreasing distance is due to the metal plate 114 translating relative to the inductor 116 (e.g., toward the inductor) as the hinge 110 operates to close. Notably, the metal plate 114 translates approximately perpendicular away from the inductor 116 as the hinge 110 operates to open, thus increasing the distance 124 between the metal plate 114 and the inductor 116 and decreasing the inductance. Similarly, the metal plate 114 translates approximately perpendicular towards the inductor 116 as the hinge 110 operates to close, thus decreasing the distance 124 between the metal plate 114 and the inductor 116 and increasing the inductance.

As shown in this example, the hinge system 108 can be implemented in the mobile device 100, such as a mobile flip-phone, and the hinge 110 and components operate to open and close the device housing 102 of the mobile device. In particular, the hinge 110 operates to open and close the flip section 106 of the device housing 102 relative to the base section 104 of the device housing of the mobile device. As noted above, the metal plate 114 remains approximately parallel with the inductor 116 throughout the rotation of the hinge 110 as it operates to open and close the device housing 102 of the mobile device. Further, the metal plate 114 translates perpendicularly, or approximately perpendicular, relative to the inductor 116 (e.g., either away from or towards the inductor) as the rotation of the hinge 110 operates to open and close the device housing 102 of the mobile device. The inductance sensor 120 is implemented as part of the hinge system 108 to detect the inductance between the inductor 116 and the metal plate 114. An increasing or higher inductance value indicates the closed position 112 of the device housing 102, and a decreasing or lower inductance value indicates the open position 130 of the device housing 102 of the mobile device.

Figure 2:
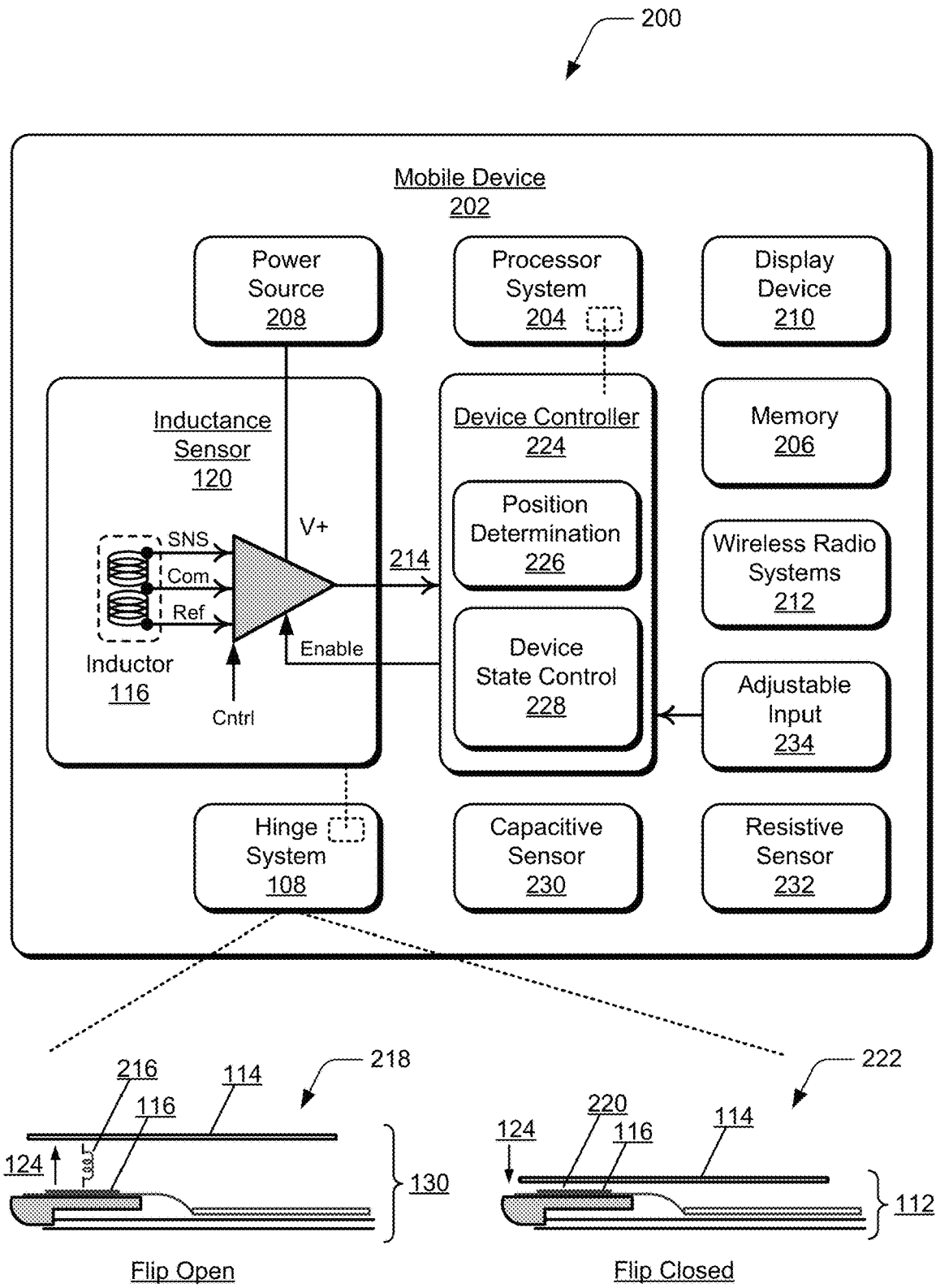
FIG. 2 illustrates an example system for flip position detection in accordance with one or more implementations described herein.

FIG. 2 illustrates an example system 200 in which aspects of flip position detection can be implemented, such as in a mobile device 202 that includes the hinge system 108 as shown and described with reference to FIG. 1. The mobile device 202 is an example of any type of device, such as an electronic device, a consumer device, a computing device, and/or the mobile device 100 implemented as a mobile flip-phone, as shown and described with reference to FIG. 1. Generally, the mobile device 202 is representative of any type of an electronic, consumer, and/or computing device implemented with various components, such as a processor system 204 and memory 206, as well as any number and combination of different components as further described with reference to the example device shown in FIG. 8. For example, the mobile device 202 can include a power source 208 to power components of the device, such as a rechargeable battery and/or any other type of active or passive power source that may be implemented in an electronic, consumer, and/or computing device. The mobile device 202 can also include an implementation of an integrated display device 210.

As a mobile flip-phone or other type of mobile phone, the mobile device 202 can include various, different wireless radio systems 212, such as for Wi-Fi, Bluetooth™, Mobile Broadband, LTE, Near Field Communication (NFC), Real-time Locating System (RTLS), or any other wireless radio system for communication via respective wireless networks. Generally, the mobile device 202 implements the wireless radio systems 212 that each include a radio device, antenna, and chipset implemented for cellular, wireless, and/or other network communication with other devices, networks, and services. A wireless radio system 212 can be configured to implement any suitable communication protocol or standard.

The mobile device 202 implements the hinge system 108 that includes the inductor 116 and the inductance sensor 120. In this example system 200, the inductance sensor 120 is implemented for an analog-to-digital output 214 that indicates the open position 130 and the closed position 112 of the hinge 110, such as a binary one (1) to indicate a higher inductance when the hinge 110 is in the closed position 112, and a binary zero (0) to indicate a lower inductance when the hinge 110 is in the open position 130. The signal to the inductance sensor 120 is a change in frequency due to a change in the current detected at the inductor 116 where the proximity of the metal plate 114 is sensed, which changes the inductance for a position indication. Notably, a lower inductance 216 indicates the open position 130 of the hinge 110 as further shown at 218, and the distance 124 between the metal plate 114 and the inductor 116 increases or is at a maximum value. Alternatively, a higher inductance 220 indicates the closed position 112 of the hinge 110 as further shown at 222, and the distance 124 between the metal plate 114 and the inductor 116 decreases or is at a minimum value.

In this example system 200, the mobile device 202 also includes a device controller 224 that implements features of flip position detection, as described herein. The device controller 224 may include independent processing, memory, and logic components functioning as a computing and/or electronic device integrated with the mobile device 202. Alternatively or in addition, the device controller 224 can be implemented as a software application or software module, such as computer-executable software instructions that are executable with a processor (e.g., with the processor system 204). As a software application, the device controller 224 can be stored on computer-readable storage memory (e.g., the memory 206), or any suitable memory device or electronic data storage implemented with the mobile device.

The device controller 224 can receive the output 214 from the inductance sensor 120 and make the position determination 226 of the hinge 110 being in the open position 130 or in the closed position 112. The device controller 224 can also initiate an operating state change of the mobile device 202, such as turning-on the device or any other operational state change, with a device state control 228 based on the inductance that indicates the open position 130 of the hinge 110, as detected by the inductance sensor 120. Similarly, the device controller 224 can initiate to turn-on the display device 210, as well as other components of the mobile device 202, with the device state control 228 based on the inductance that indicates the open position 130 of the hinge 110, as detected by the inductance sensor 120.

Although the inductance sensor 120 is shown and described as being implemented for the analog-to-digital output 214 that indicates the open and closed positions of the hinge 110 in a binary form, the inductance sensor 120 may be implemented for an analog output from which additional inductance values can be detected. The device controller 224 can then determine multiple positions of the hinge 110 between the fully-open and fully-closed positions, where the multiple positions of the hinge 110 correspond to, and are determined from, changing inductance values that are detected by the inductance sensor 120 for position determination as the hinge 110 operates to open and close. Notably, the device controller 224 can be implemented for multi-position determination of the flip section 106 of the device housing 102 relative to the base section 104 of the device housing of the mobile device 100, which is shown and described as the mobile flip-phone with reference to FIG. 1.

As noted above, the mobile device 202 in this example is generally implemented for inductive flip position detection with the hinge system 108 designed for inductive sensing utilizing the inductance sensor 120. Alternatively or in addition, the mobile device 202 may be implemented with a capacitive sensor 230, and the hinge system 108 designed for capacitive flip position detection, such as in a mobile flip-phone to detect an open or closed position of the device. Similarly, the mobile device 202 may be implemented with a resistive sensor 232, and the hinge system 108 designed for resistive flip position detection, such as in a mobile flip-phone to detect an open or closed position of the device. Although not specifically shown, both or either of the capacitive sensor 230 and the resistive sensor 232 may be powered by the device power source 208 as part of the hinge system 108 in the mobile device 202.

In implementations, the device controller 224 can be designed to receive an adjustable input 234 of an inductance, capacitance, or resistance value that will be used to define the open position of the hinge 110, and the inductance, capacitance, or resistance value is then detectable as the hinge 110 operates to open. For example, the inductance sensor 120 can detect an inductance value that corresponds to the open position of the hinge 110, which may be a preset inductance value that indicates the full-open position 130 of the hinge, or the inductance value may be programmed as the adjustable input 234 to the device controller 224 to define the open position of the hinge (e.g., an angle of the open position of the hinge).

Example methods 300, 400, 500, 600, and 700 are described with reference to respective FIGS. 3-7 in accordance with implementations of flip position detection. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, some of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
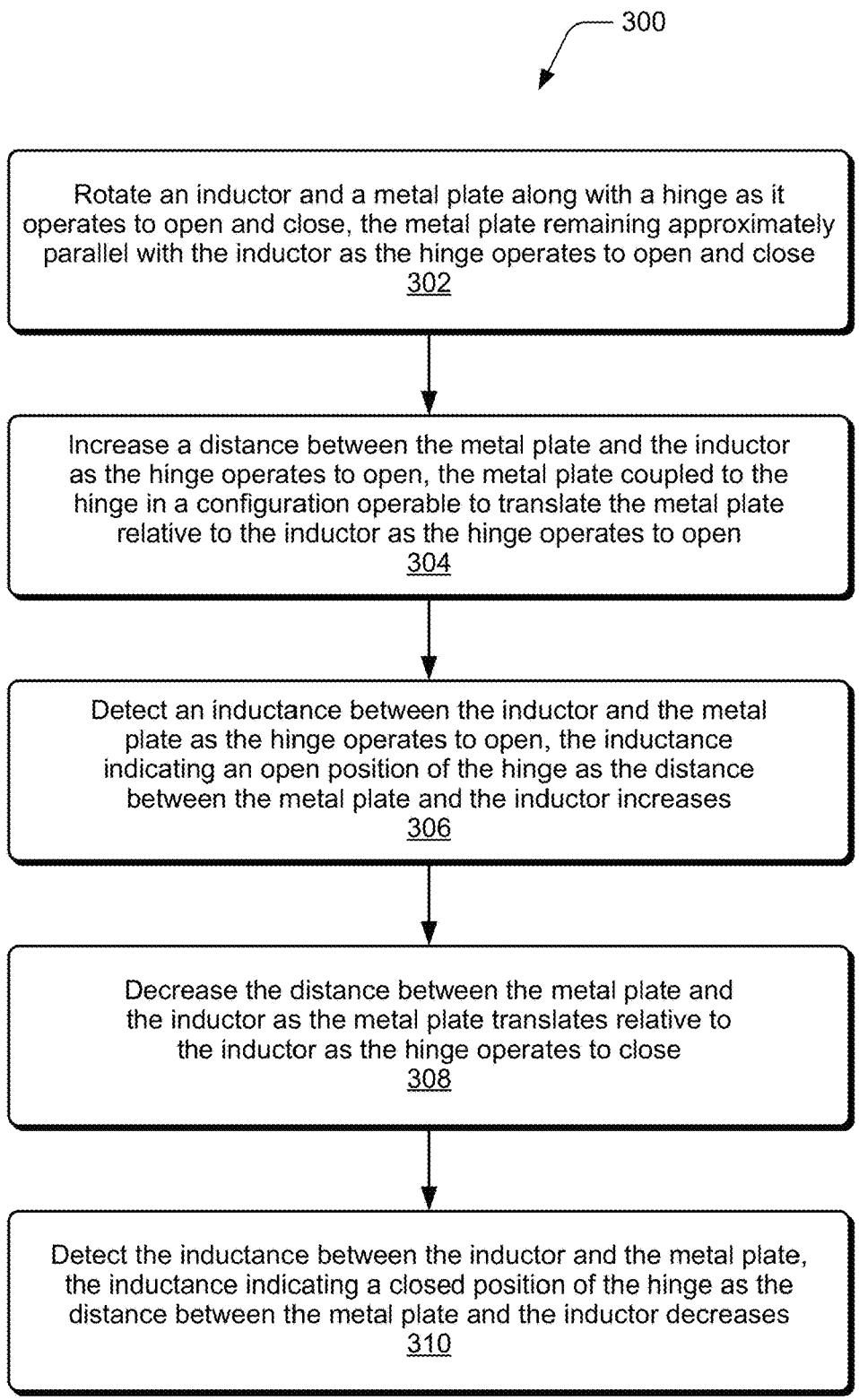
FIGS. 3-5 illustrate example methods of flip position detection, generally in the context of inductive flip position detection, in accordance with one or more implementations described herein.

FIG. 3 illustrates example method(s) 300 of flip position detection as described herein, and the method is generally described in the context of inductive flip position detection with reference to a hinge system. The order in which the method is described is not intended to be construed as a limitation, and any number or combination of the described method operations can be performed in any order to perform a method, or an alternate method.

At 302, an inductor and a metal plate are rotated along with a hinge as it operates to open and close, the metal plate remaining approximately parallel with the inductor as the hinge operates to open and close. For example, the hinge system 108 includes the inductor 116 and the metal plate 114 that rotate along with the hinge 110 as it operates to open and close, as described with reference to the sequence of illustrations shown in FIG. 1. Notably, the metal plate 114 remains approximately parallel with the inductor 116 as the hinge 110 rotates and operates to open and close. Generally, the metal plate 114 can be designed to remain parallel with the inductor 116 as the hinge 110 rotates, however, some angular variations may occur between the metal plate and the inductor as the hinge rotates, or angular variations between the metal plate and the inductor may be a design choice.

At 304, a distance between the metal plate and the inductor increases as the hinge operates to open, the metal plate coupled to the hinge in a configuration operable to translate the metal plate relative to the inductor as the hinge operates to open. For example, the hinge system 108 includes the metal plate 114 coupled to the hinge 110 in a configuration operable to translate the metal plate 114 perpendicularly, or approximately perpendicular, relative to the inductor 116 as the hinge 110 operates to open, as described with reference to the sequence of illustrations shown in FIG. 1. Notably, as the hinge 110 operates to open, the distance 124 between the metal plate 114 and the inductor 116 increases, as further shown at 218.

At 306, an inductance is detected between the inductor and the metal plate as the hinge operates to open, the inductance indicating an open position of the hinge as the distance between the metal plate and the inductor increases. For example, the inductance sensor 120 detects the lower inductance 216 between the inductor 116 and the metal plate 114 as the hinge 110 operates to open, and a decreasing or lower inductance indicates the open position 130 of the hinge 110 as the distance between the metal plate 114 and the inductor 116 increases.

At 308, the distance between the metal plate and the inductor decreases as the metal plate translates relative to the inductor as the hinge operates to close. For example, the metal plate 114 translates perpendicularly, or approximately perpendicular, relative to the inductor 116 as the hinge 110 operates to close, as described with reference to the sequence of illustrations shown in FIG. 1. Notably, as the hinge 110 operates to close, the distance 124 between the metal plate 114 and the inductor 116 decreases, as further shown at 222.

At 310, the inductance is detected between the inductor and the metal plate as the hinge operates to close, the inductance indicating a closed position of the hinge as the distance between the metal plate and the inductor decreases. For example, the inductance sensor 120 detects the higher inductance 220 between the inductor 116 and the metal plate 114 as the hinge 110 operates to close, and an increasing or higher inductance indicates the closed position 112 of the hinge 110 as the distance between the metal plate 114 and the inductor 116 decreases.

Figure 4:
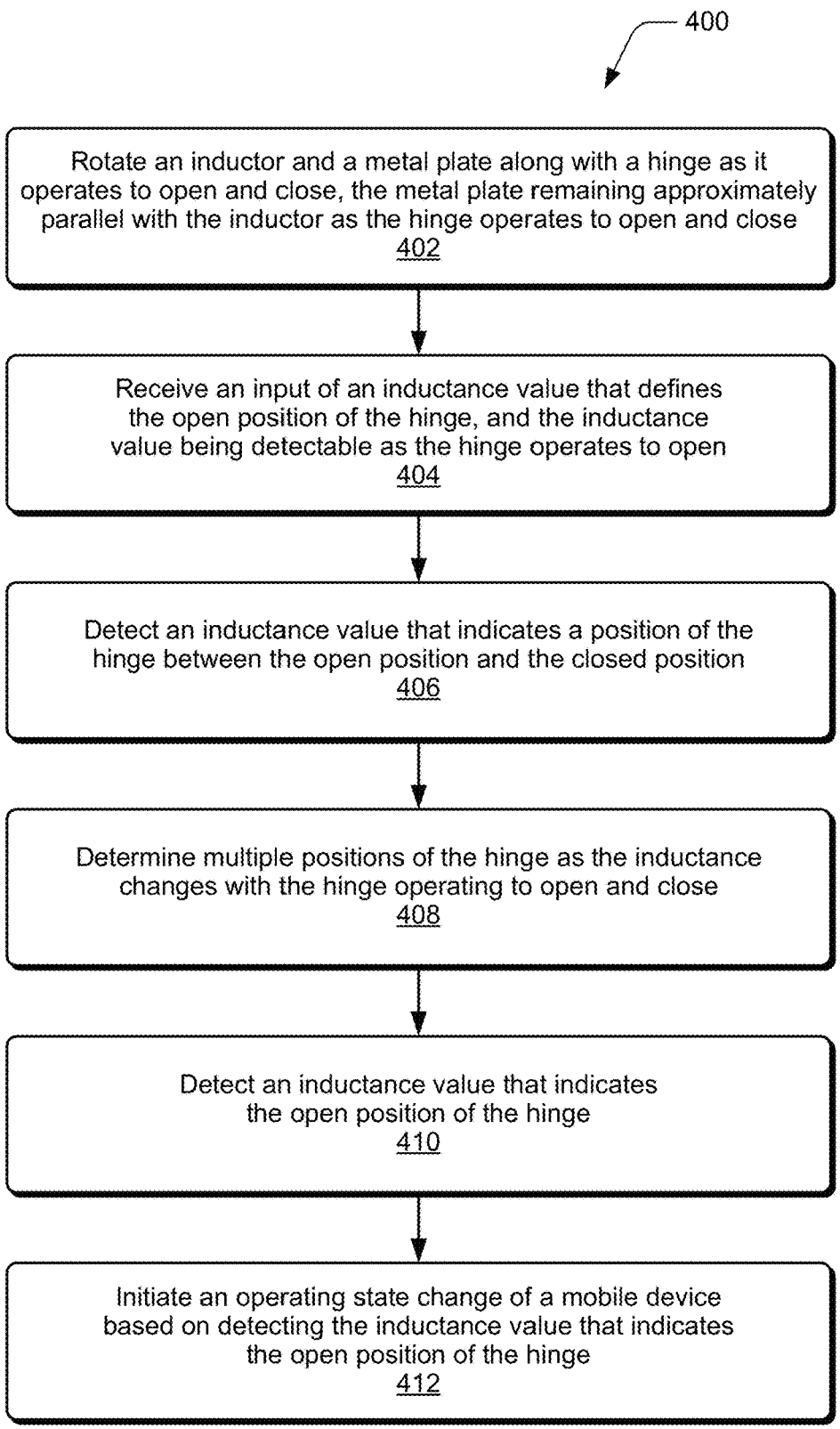

FIG. 4 illustrates example method(s) 400 of flip position detection as described herein, and the method is generally described in the context of inductive flip position detection with reference to a hinge system. The order in which the method is described is not intended to be construed as a limitation, and any number or combination of the described method operations can be performed in any order to perform a method, or an alternate method.

At 402, an inductor and a metal plate are rotated along with a hinge as it operates to open and close, the metal plate remaining approximately parallel with the inductor as the hinge operates to open and close. For example, the hinge system 108 includes the inductor 116 and the metal plate 114 that rotate along with the hinge 110 as it operates to open and close, as described with reference to the sequence of illustrations shown in FIG. 1. Notably, the metal plate 114 remains approximately parallel with the inductor 116 as the hinge 110 rotates and operates to open and close. Generally, the metal plate 114 can be designed to remain parallel with the inductor 116 as the hinge 110 rotates, however, some angular variations may occur between the metal plate and the inductor as the hinge rotates, or angular variations between the metal plate and the inductor may be a design choice.

At 404, an input of an inductance value is received that defines the open position of the hinge, and the inductance value being detectable as the hinge operates to open. For example, the device controller 224 receives the adjustable input 234 of an inductance value that will be used to define the open position of the hinge 110, and the inductance value is then detectable as the hinge 110 operates to open. In other implementations, the device controller 224 receives the adjustable input 234 of a capacitance or resistance value that will be used to define the open position of the hinge 110, and the capacitance or resistance value is then detectable as the hinge 110 operates to open.

At 406, an inductance value is detected that indicates a position of the hinge between the open position and the closed position. Similarly, at 408, multiple positions of the hinge are determined as the inductance changes with the hinge operating to open and close. For example, the inductance sensor 120 detects an inductance value that indicates a position of the hinge 110 between the open position 130 and the closed position 112 of the hinge. Although the inductance sensor 120 is shown and described as being implemented for the analog-to-digital output 214 that indicates the open and closed positions of the hinge 110 in binary form, the inductance sensor 120 may be implemented for analog output from which multiple inductance values can be detected. The device controller 224 can then determine multiple positions of the hinge 110 between the open and closed positions, where the multiple positions of the hinge 110 correspond to, and are determined from, the additional inductance values that are detected by the inductance sensor 120 for position determination.

At 410, an inductance value is detected that indicates the open position of the hinge. For example, the inductance sensor 120 detects an inductance value that indicates the open position 130 of the hinge 110, which may be a preset inductance value that indicates the full-open position of the hinge, such as shown at 132, or the inductance value may be programmed as the adjustable input 234 that is received at 404 to define the open position of the hinge.

At 412, an operating state change of the mobile device is initiated based on detecting the inductance value that indicates the open position of the hinge. For example, the device controller 224 of the mobile device 202 initiates an operating state change of the device, such as to turn-on the device or any other operational state change, with the device state control 228 based on the inductance value that is detected by the inductance sensor 120, which indicates the open position of the hinge 110, as implemented in the mobile device. Similarly, the device controller 224 initiates to turn-on the display device 210, as well as other components of the mobile device 202, with the device state control 228 based on the inductance that indicates the open position 130 of the hinge 110, as detected by the inductance sensor 120.

Figure 5:
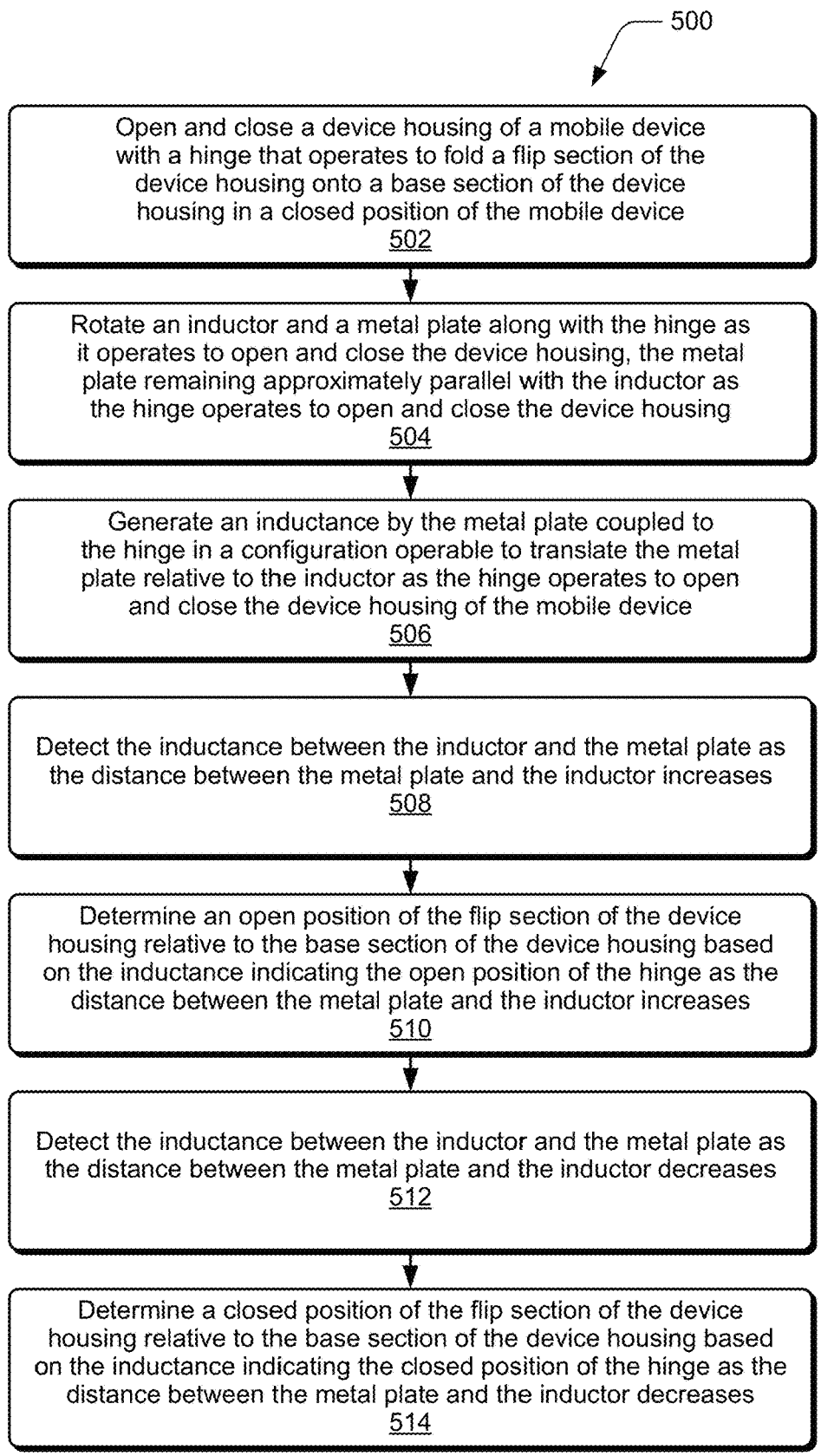

FIG. 5 illustrates example method(s) 500 of flip position detection as described herein, and the method is generally described in the context of inductive flip position detection with reference to a mobile device that implements a hinge system. The order in which the method is described is not intended to be construed as a limitation, and any number or combination of the described method operations can be performed in any order to perform a method, or an alternate method.

At 502, a device housing of a mobile device is opened and closed with a hinge that operates to fold a flip section of the device housing onto a base section of the device housing in a closed position of the mobile device. For example, the hinge 110 closes the device housing 102 of the mobile device 100 as the hinge operates to fold the flip section 106 of the device housing onto the base section 104 of the device housing in the closed position 112 of the mobile device.

At 504, an inductor and a metal plate are rotated along with the hinge as it operates to open and close the device housing, the metal plate remaining approximately parallel with the inductor as the hinge operates to open and close. For example, the hinge system 108 includes the inductor 116 and the metal plate 114 that rotate along with the hinge 110 as it operates to open and close the device housing 102 of the mobile device 100, as described with reference to the sequence of illustrations shown in FIG. 1. Notably, the metal plate 114 remains approximately parallel with the inductor 116 as the hinge 110 rotates and operates to open and close the device housing 102 of the device. Generally, the metal plate 114 can be designed to remain parallel with the inductor 116 as the hinge 110 rotates, however, some angular variations may occur between the metal plate and the inductor as the hinge rotates, or angular variations between the metal plate and the inductor may be a design choice.

At 506, an inductance is generated by the metal plate coupled to the hinge in a configuration operable to translate the metal plate relative to the inductor as the hinge operates to open and close the device housing of the mobile device. For example, an inductance is generated by the metal plate 114 coupled to the hinge 110 in a configuration operable to translate the metal plate 114 perpendicularly, or approximately perpendicular, relative to the inductor 116 as the hinge operates to open and close the device housing 102 of the mobile device 100.

At 508, the inductance between the inductor and the metal plate is detected as the distance between the metal plate and the inductor increases. At 510, an open position of the flip section of the device housing relative to the base section of the device housing is determined based on the inductance indicating the open position of the hinge as the distance between the metal plate and the inductor increases. For example, the inductance sensor 120 detects that the inductance between the inductor 116 and the metal plate 114 decreases as the hinge 110 operates to open the device housing 102 of the mobile device. As the hinge 110 operates to open, the distance 124 between the metal plate 114 and the inductor 116 increases, as further shown at 218. The device controller 224 determines the open position 130 of the flip section 106 of the device housing 102 relative to the base section 104 of the device housing based on the inductance decreasing as the distance 124 between the metal plate 114 and the inductor 116 increases.

At 512, the inductance between the inductor and the metal plate is detected as the distance between the metal plate and the inductor decreases. At 514, a closed position of the flip section of the device housing relative to the base section of the device housing is determined based on the inductance indicating the closed position of the hinge as the distance between the metal plate and the inductor decreases. For example, the inductance sensor 120 detects that the inductance between the inductor 116 and the metal plate 114 increases as the hinge 110 operates to close the device housing 102 of the mobile device. As the hinge 110 operates to close, the distance 124 between the metal plate 114 and the inductor 116 decreases, as further shown at 222. The device controller 224 determines the closed position 112 of the flip section 106 of the device housing 102 relative to the base section 104 of the device housing based on the inductance increasing as the distance 124 between the metal plate 114 and the inductor 116 decreases.

FIG. 6 illustrates example method(s) 600 of flip position detection as described herein, and the method is generally described in the context of capacitive flip position detection with reference to a mobile device that implements a hinge system. The order in which the method is described is not intended to be construed as a limitation, and any number or combination of the described method operations can be performed in any order to perform a method, or an alternate method.

At 602, a device housing of a hinged device is opened and closed with a hinge that operates to fold a flip section of the device housing onto a base section of the device housing in a closed position of the hinged device. For example, the hinge 110 closes the device housing 102 of the mobile device 100 as the hinge operates to fold the flip section 106 of the device housing onto the base section 104 of the device housing in the closed position 112 of the mobile device (e.g., a hinged device).

At 604, a capacitive sensor is rotated along with the hinge as it operates to open and close the device housing of the hinged device. For example, the hinge system 108 includes the capacitive sensor 230 that rotates along with the hinge 110 as it operates to open and close the device housing 102 of the mobile device 100, as generally described with reference to the sequence of illustrations shown in FIG. 1.

At 606, a capacitance is generated by the capacitive sensor coupled to the hinge in a configuration operable to translate a hinge component relative to the capacitive sensor as the hinge operates to open and close the device housing of the hinged device. For example, a capacitance is generated as a hinge component that is coupled to the hinge 110 translates relative to the capacitive sensor 230 as the hinge operates to open and close the device housing 102 of the mobile device.

At 608, an open position of the flip section of the device housing relative to the base section of the device housing is determined based on detected capacitance indicating the open position of the hinge. For example, the capacitive sensor 230 detects the capacitance as the hinge 110 operates to open the device housing 102 of the mobile device. Similarly at 610, an closed position of the flip section of the device housing relative to the base section of the device housing is determined based on detected capacitance indicating the closed position of the hinge. For example, the capacitive sensor 230 detects that the capacitance as the hinge 110 operates to close the device housing 102 of the mobile device.

Figure 7:
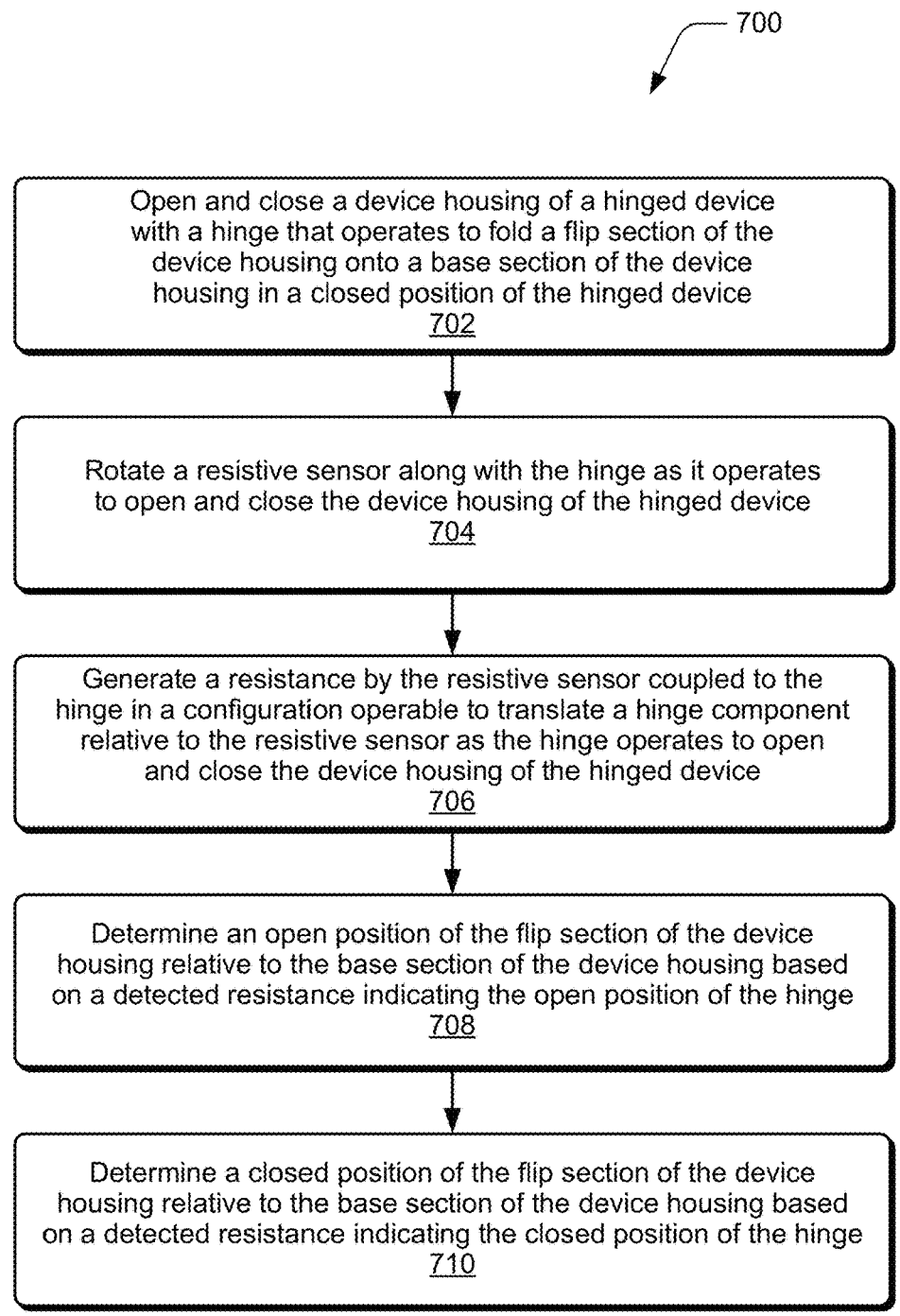
FIG. 7 illustrates an example method of flip position detection, generally in the context of resistive flip position detection, in accordance with one or more implementations described herein.

FIG. 7 illustrates example method(s) 700 of flip position detection as described herein, and the method is generally described in the context of resistive flip position detection with reference to a mobile device that implements a hinge system. The order in which the method is described is not intended to be construed as a limitation, and any number or combination of the described method operations can be performed in any order to perform a method, or an alternate method.

At 702, a device housing of a hinged device is opened and closed with a hinge that operates to fold a flip section of the device housing onto a base section of the device housing in a closed position of the hinged device. For example, the hinge 110 closes the device housing 102 of the mobile device 100 as the hinge operates to fold the flip section 106 of the device housing onto the base section 104 of the device housing in the closed position 112 of the mobile device (e.g., a hinged device).

At 704, a resistive sensor is rotated along with the hinge as it operates to open and close the device housing of the hinged device. For example, the hinge system 108 includes the resistive sensor 232 that rotates along with the hinge 110 as it operates to open and close the device housing 102 of the mobile device 100, as generally described with reference to the sequence of illustrations shown in FIG. 1.

At 706, a resistance is generated by the resistive sensor coupled to the hinge in a configuration operable to translate a hinge component relative to the resistive sensor as the hinge operates to open and close the device housing of the hinged device. For example, a resistance is generated as a hinge component that is coupled to the hinge 110 translates relative to the resistive sensor 232 as the hinge operates to open and close the device housing 102 of the mobile device.

At 708, an open position of the flip section of the device housing relative to the base section of the device housing is determined based on detected resistance indicating the open position of the hinge. For example, the resistive sensor 232 detects the resistance as the hinge 110 operates to open the device housing 102 of the mobile device. Similarly at 710, a closed position of the flip section of the device housing relative to the base section of the device housing is determined based on detected resistance indicating the closed position of the hinge. For example, the resistive sensor 232 detects the resistance as the hinge 110 operates to close the device housing 102 of the mobile device.

Figure 8:
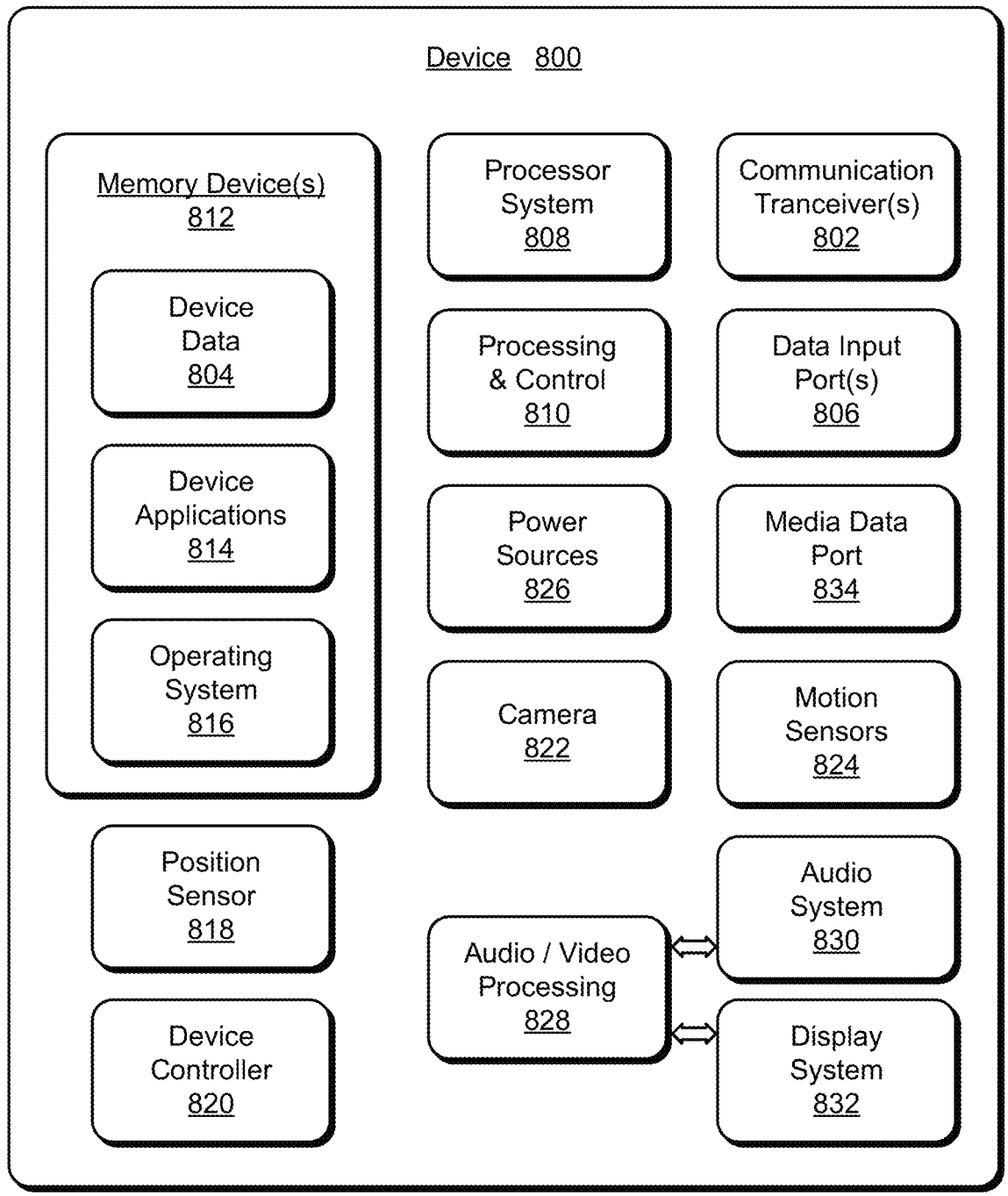
FIG. 8 illustrates various components of an example device that can implement aspects of flip position detection.

FIG. 8 illustrates various components of an example device 800 in which aspects of flip position detection can be implemented. The example device 800 can be implemented as any of the devices described with reference to the previous FIGS. 1-7, such as any type of mobile device, mobile phone, client device, wearable device, tablet, computing, communication, entertainment, gaming, media playback, and/or other type of electronic device. For example, the mobile device 100 and the mobile device 202 shown and described with reference to FIGS. 1 and 2 may be implemented as the example device 800. Further a wearable device may include any one or combination of a watch, armband, wristband, bracelet, glove or pair of gloves, glasses, jewelry items, clothing items, any type of footwear or headwear, and/or other types of wearables.

The device 800 includes communication transceivers 802 that enable wired and/or wireless communication of device data 804 with other devices. The device data 804 can include any of the detected inductance values, hinge position determinations, and device controller data. Additionally, the device data 804 can include any type of audio, video, and/or image data. Example communication transceivers 802 include wireless personal area network (WPAN) radios compliant with various IEEE 802.15 (Bluetooth™) standards, wireless local area network (WLAN) radios compliant with any of the various IEEE 802.11 (WiFi') standards, wireless wide area network (WWAN) radios for cellular phone communication, wireless metropolitan area network (WMAN) radios compliant with various IEEE 802.16 (Wi-MAX') standards, and wired local area network (LAN) Ethernet transceivers for network data communication.

The device 800 may also include one or more data input ports 806 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 800 includes a processor system 808 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 810. The device 800 may further include any type of a system bus or other data and command transfer system that couples the various components within the device. A system bus can include any one or combination of different bus structures and architectures, as well as control and data lines.

The device 800 also includes computer-readable storage memory 812 (e.g., memory devices) that enable data storage, such as data storage devices that can be accessed by a computing device, and that provide persistent storage of data and executable instructions (e.g., software applications, programs, functions, and the like). Examples of the computer-readable storage memory 812 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 800 may also include a mass storage media device.

The computer-readable storage memory 812 provides data storage mechanisms to store the device data 804, other types of information and/or data, and various device applications 814 (e.g., software applications). For example, an operating system 816 can be maintained as software instructions with a memory device and executed by the processor system 808. The device applications may also include a device manager, such as any form of a control application, software application, signal-processing and control module, code that is native to a particular device, a hardware abstraction layer for a particular device, and so on.

In this example, the device 800 includes a position sensor 818 and a device controller 820 that implements aspects of flip position detection. The device controller 820 may be implemented with hardware components and/or in software as one of the device applications 814, such as when the device 800 is implemented as the mobile device 100 or as the mobile device 202 described with reference to FIGS. 1 and 2. An example of the position sensor 818 is any one or combination of the inductance sensor 120, the capacitive sensor 230, and the resistive sensor 232. An example of the device controller 820 is the device controller 224 that is implemented as a software application and/or as hardware components in the mobile device 202. In implementations, the device controller 820 may include independent processing, memory, and logic components as a computing and/or electronic device integrated with the device 800.

In this example, the example device 800 also includes a camera 822 and motion sensors 824, such as may be implemented in an inertial measurement unit (IMU). The motion sensors 824 can be implemented with various sensors, such as a gyroscope, an accelerometer, and/or other types of motion sensors to sense motion of the device. The various motion sensors 824 may also be implemented as components of an inertial measurement unit in the device. The motion sensors 824 can generate sensor data vectors having three-dimensional parameters (e.g., rotational vectors in x, y, and z coordinates) indicating position, location, and/or orientation of the device. The device 800 can also include one or more power sources 826, such as when the device is implemented as a mobile device. The power sources may include a charging and/or power system, and can be implemented as a flexible strip battery, a rechargeable battery, a charged super-capacitor, and/or any other type of active or passive power source.

The device 800 also includes an audio and/or video processing system 828 that generates audio data for an audio system 830 and/or generates display data for a display system 832. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 834. In implementations, the audio system and/or the display system are integrated components of the example device. Alternatively, the audio system and/or the display system are external, peripheral components to the example device.

Although implementations of flip position detection have been described in language specific to features and/or methods, the subject of the appended claims is not necessarily limited to the specific features or methods described. Rather, the features and methods are disclosed as example implementations of flip position detection, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A mobile device, comprising: a device housing having a base section and a flip section operable to fold onto the base section in a closed position of the mobile device; a hinge operable between the closed position and an open position of the mobile device, the flip section of the device housing operable to open relative to the base section of the device housing; an inductor positioned in the device housing to have an inductance as the hinge operates to said open and close the device housing; a metal plate coupled to the hinge in a configuration operable to translate the metal plate relative to the inductor as the hinge operates between the open position and the closed position; and a sensor to detect the inductance between the inductor and the metal plate, a first inductance value indicates the closed position of the device housing and a second inductance value indicates the open position of the device housing.

Alternatively or in addition to the above described mobile device, any one or combination of: the inductor and the metal plate rotate with the hinge as it operates between the open position and the closed position, and the metal plate remains approximately parallel with the inductor as the metal plate translates approximately perpendicular relative to the inductor. A third inductance value indicates a position of the hinge between the open position and the closed position. The multiple inductance values each correlate to one of multiple positions of the hinge between the open position and the closed position. The inductor is positioned in the device housing on a flexible printed circuit that couples to the sensor. A device controller for multi-position determination of the flip section of the device housing relative to the base section of the device housing, the multi-position determination based on the sensor detection of the inductance changing as the hinge operates between the open position and the closed position. A device controller to initiate an operating state change of the mobile device based on detection of the second inductance value that indicates the open position of the device housing. A device controller to initiate turning-on a display device based on detection of the second inductance value that indicates the open position of the device housing.

A hinge system, comprising: a hinge operable between an open position and a closed position; an inductor positioned to have an inductance as the hinge operates between the open position and the closed position; a metal plate coupled to the hinge in a configuration operable to translate the metal plate relative to the inductor as the hinge operates between the open position and the closed position; and a sensor to detect the inductance between the inductor and the metal plate, an increase in the inductance indicates the closed position of the hinge and a decrease in the inductance indicates the open position of the hinge.

Alternatively or in addition to the above described hinge system, any one or combination of: the inductor and the metal plate rotate with the hinge as it operates between the open position and the closed position, and the metal plate remaining approximately parallel with the inductor as the metal plate translates approximately perpendicular relative to the inductor. An inductance value indicates a position of the hinge between the open position and the closed position. The inductor is a component of an inductive circuit formed on a flexible printed circuit that couples to the sensor. The inductance is detectable by the sensor to indicate multiple positions of the hinge as the inductance changes with the hinge operating between the open position and the closed position. An adjustable controller to define the open position of the hinge based on an inductance value that is detectable as the hinge operates to open and close.

A method comprising: increasing a distance between a metal plate and an inductor, the metal plate coupled to a hinge in a configuration operable to translate the metal plate relative to the inductor as the hinge operates to open; detecting an inductance between the inductor and the metal plate, the inductance indicating an open position of the hinge as the distance between the metal plate and the inductor increases; decreasing the distance between the metal plate and the inductor as the metal plate translates relative to the inductor as the hinge operates to close; and detecting the inductance between the inductor and the metal plate, the inductance indicating a closed position of the hinge as the distance between the metal plate and the inductor decreases.

Alternatively or in addition to the above described method, any one or combination of: rotating the inductor and the metal plate along with the hinge as it operates to open and close, the metal plate remaining approximately parallel with the inductor as the metal plate translates approximately perpendicular relative to the inductor. Detecting an inductance value that indicates a position of the hinge between the open position and the closed position. Initiating an operating state change of a mobile device based on the detecting the inductance that indicates the open position of the hinge. Determining multiple positions of the hinge as the inductance changes with the hinge operating to open and close. Receiving an input of an inductance value that defines the open position of the hinge, and the inductance value being detectable as the hinge operates to open.

The invention claimed is:

1. A mobile device, comprising:
a device housing having a base section and a flip section operable to fold onto the base section in a closed position of the mobile device;
a hinge operable between the closed position and an open position of the mobile device, the flip section of the device housing operable to open relative to the base section of the device housing;
a metal plate coupled to the hinge in a configuration operable to translate the metal plate relative to a passive material that interacts with the metal plate as the hinge operates between the open position and the closed position, the passive material and the metal plate rotating with the hinge as it operates between the open position and the closed position.

2. The mobile device as recited in claim 1, wherein:
the passive material is one of an inductor, a capacitor, or a resistor; and
the metal plate remains approximately parallel with the inductor, the capacitor, or the resistor as the metal plate translates approximately perpendicular relative to the inductor, the capacitor, or the resistor.

3. The mobile device as recited in claim 1, further comprising a sensor to detect interaction values between the passive material and the metal plate, a first interaction value indicating the closed position of the device housing and a second interaction value indicating the open position of the device housing.

4. The mobile device as recited in claim 3, wherein the interaction values each correlate to one of multiple positions of the hinge between the open position and the closed position.

5. The mobile device as recited in claim 1, wherein the passive material is positioned in the device housing on a flexible printed circuit that couples to a sensor configured to detect interaction values between the passive material and the metal plate.

6. The mobile device as recited in claim 5, further comprising a device controller for multi-position determination of the flip section of the device housing relative to the base section of the device housing, the multi-position determination based on sensor detection of the interaction values changing as the hinge operates between the open position and the closed position.

7. The mobile device as recited in claim 1, further comprising a device controller to initiate an operating state change of the mobile device based on detection of an interaction value between the passive material and the metal plate that indicates the open position of the device housing.

8. The mobile device as recited in claim 1, further comprising a device controller to initiate turning-on a display device based on detection of an interaction value between the passive material and the metal plate that indicates the open position of the device housing.

9. A hinge system, comprising:
a hinge operable between an open position and a closed position;
a passive material positioned to have one of an inductance, a capacitance, or a resistance as the hinge operates between the open position and the closed position;
a metal plate coupled to the hinge in a configuration operable to translate the metal plate relative to the passive material that interacts with the metal plate as the hinge operates between the open position and the closed position, the passive material and the metal plate rotating with the hinge as it operates between the open position and the closed position.

10. The hinge system as recited in claim 9, wherein:
the passive material is one of an inductor, a capacitor, or a resistor; and
the metal plate remains approximately parallel with the inductor, the capacitor, or the resistor as the metal plate translates approximately perpendicular relative to the inductor, the capacitor, or the resistor.

11. The hinge system as recited in claim 9, further comprising a sensor to detect interaction values between the passive material and the metal plate, a first interaction value indicating the closed position of the hinge and a second interaction value indicating the open position of the hinge.

12. The hinge system as recited in claim 9, wherein the passive material is a component of a circuit formed on a flexible printed circuit that couples to a sensor configured to detect interaction values between the passive material and the metal plate.

13. The hinge system as recited in claim 12, wherein the interaction values are detectable by the sensor to indicate multiple positions of the hinge as the interaction values change with the hinge operating between the open position and the closed position.

14. The hinge system as recited in claim 9, further comprising an adjustable controller to define the open position of the hinge based on an interaction value between the passive material and the metal plate that is detectable as the hinge operates to open and close.

15. A method, comprising:
increasing a distance between a metal plate and a passive material, the metal plate coupled to a hinge in a configuration operable to translate the metal plate relative to the passive material as the hinge operates to open, the passive material and the metal plate rotating along with the hinge as it operates to open and close;
detecting an interaction value between the passive material and the metal plate, the interaction value indicating an open position of the hinge as the distance between the metal plate and the passive material increases;
decreasing the distance between the metal plate and the passive material as the metal plate translates relative to the passive material as the hinge operates to close; and
detecting a different interaction value between the passive material and the metal plate, the different interaction value indicating a closed position of the hinge as the distance between the metal plate and the passive material decreases.

16. The method as recited in claim 15, wherein:
the passive material is one of an inductor, a capacitor, or a resistor; and
the metal plate remains approximately parallel with the inductor, the capacitor, or the resistor as the metal plate translates approximately perpendicular relative to the inductor, the capacitor, or the resistor.

17. The method as recited in claim 15, further comprising:
detecting an interaction value that indicates a position of the hinge between the open position and the closed position.

18. The method as recited in claim 15, further comprising:
initiating an operating state change of a mobile device based on the detecting the interaction value that indicates the open position of the hinge.

19. The method as recited in claim 15, further comprising:
determining multiple positions of the hinge as the interaction values change with the hinge operating to open and close.

20. The method as recited in claim 15, further comprising:
receiving an input of an interaction value that defines the open position of the hinge, and the interaction value being detectable as the hinge operates to open.

\* \* \* \* \*